Dec. 21, 1943.   W. WITHINGTON   2,337,141
COMBINATION WEED CUTTER AND HOE
Filed Sept. 5, 1941   2 Sheets-Sheet 1
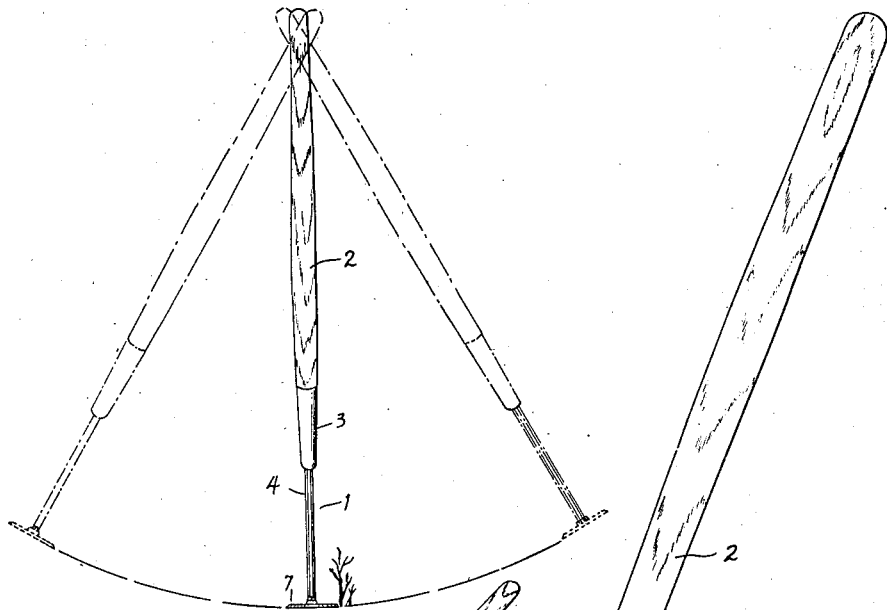
Fig. 6.
Fig. 7.
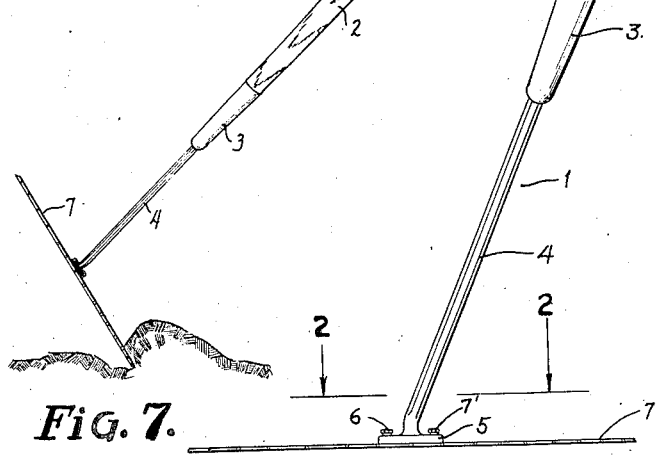
Fig. 1.

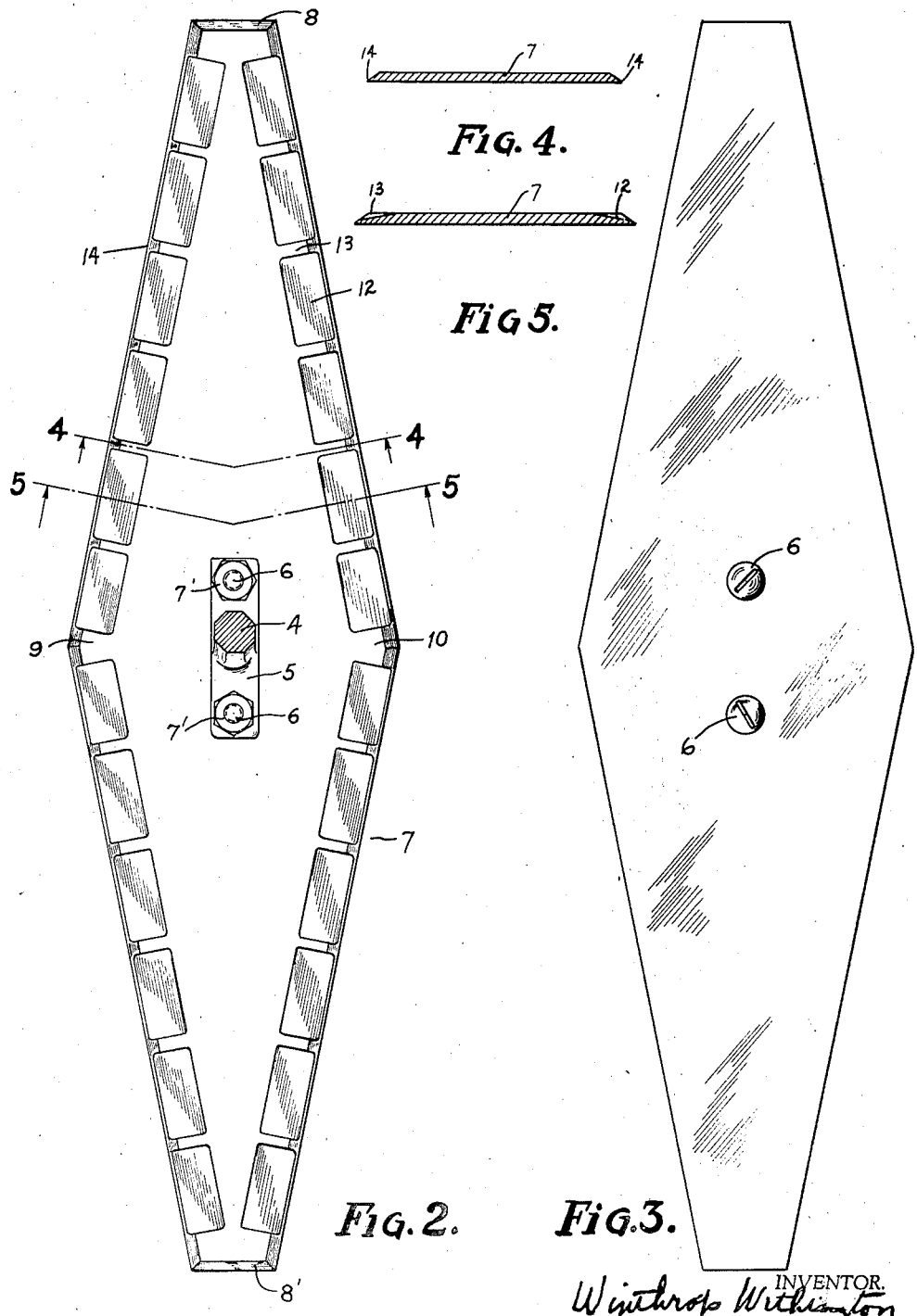

Patented Dec. 21, 1943

2,337,141

UNITED STATES PATENT OFFICE 2,337,141

COMBINATION WEED CUTTER AND HOE

Winthrop Withington, Shaker Heights, Ohio, assignor to The American Fork & Hoe Company, Cleveland, Ohio, a corporation of Ohio Application September 5, 1941, Serial No. 409,596

2 Claims. (Cl. 97—65)

My invention relates to lawn and garden implements and relates more specifically to an improved combination weeder and hoe.

It is an object of my invention to provide an improved combination implement of the class described.

Another object of my invention is to provide an implement which will be useful not only for cutting down weeds and the like but also in breaking up soil in the general manner of the use of a hoe.

Another object of my invention is to provide an implement of the class referred to which will be inexpensive to manufacture, efficient in use and which will maintain its improved cutting and hoeing qualities for a relatively long period.

Another object of my invention is to provide an implement of the type referred to which will operate easily and efficiently and which, when operated as a weeder, will cut through weeds or the like readily and without noticeable torsioning or twisting efforts transmitted to the handle and the hands of the user.

Another object of my invention is to provide a combined implement of the class referred to which will eliminate the necessity of use of a plurality of tools for the above diverse purposes.

Other objects of my invention and the invention itself will become increasingly apparent by reference to the following description and drawings of an embodiment of my invention, in which drawings:

Fig. 1 is a side elevational view of the improved implement of my invention;

Fig. 2 is a top plan view of the blade of my invention taken from the plane 2—2 of Fig. 1;

Fig. 3 is a bottom plan view of the blade of Fig. 2;

Fig. 4 is a sectional view taken from the line 4—4 of Fig. 2;

Fig. 5 is a sectional view taken from the line 5—5 of Fig. 2;

Fig. 6 is a diagrammatic view of the improved implement of my invention when such implement is used as a weeder; and Fig. 7 is a side elevational view of the improved implement of my invention when used as a hoe.

Referring now to the drawings which illustrate merely one of varying embodiments of my invention, at 1, I show the improved implement of my invention having a wooden handle portion 2 securely fastened by means of a socket 3 to a metal handle portion 4, said metal portion terminating in a base plate 5 and secured by means of bolts 6 which project through apertures 6′ provided in the blade 7 to the said blade, being securely fastened thereto by means of nuts 7′ screw threaded over the ends of said threaded bolts.

The blade 7, preferably as shown in hexagonal form, is best illustrated in Fig. 2, and formed of sheet metal with the more centrally disposed portions adjacent the handle 4 being relatively thicker than more outwardly extending portions of the blade bordering the cutting edges thereof. The blade is provided, as shown in Fig. 2, with a pair of opposite relatively narrow end portions 8—8′ disposed in generally parallel widely spaced relation, said portions being referred to as the duplicated "hoe" ends of the blade. These portions 8—8′ are joined at either side thereof by generally obtusely V-shaped side portions 9 and 10 of the blade, referred to herein as "weeder" portions, the apex of the V sides as well as the end portions of the blade adjacent the hoe ends carrying a broad extension of the relatively thicker portions of the blades toward their bevelled cutting edges.

The V-shaped weeder portions 9 and 10 of the blade are provided with a plurality of integrally spaced sections or substantially parallel ribs 13 extending from the thicker centrally disposed blade portions, said ribs being interposed between relatively wider thinner portions 12 formed by bevelling the generally outwardly extending faces of the weeder portions whereby the blade is provided with a generally centrally disposed relatively thicker portion and outwardly extending relatively thinner portions, said thinner portions 12 being reinforced by thicker reinforcing extensions 13 of the relatively thicker central portion.

Cutting edges 14 of the blade are provided on all six sides of the preferably generally hexagonal blade and the blade edge, including the reinforcing rib portions, is bevelled to provide continuity of cutting edge.

The handle of my improved tool is preferably straight and disposed at an acute angle to the blade proper, as shown in Fig. 1, and when loosely grasped by the operator and swung through an arc generally in the manner of the operation of a golf club, as illustrated in Fig. 6, the apex of the forwardly disposed V-shaped edge portion of the blade leads the balance of he blade in its downward stroke, and weeds or the like are exposed to a draw-cut stroke, with the more rearwardly disposed side portions of the blade continuing the slicing or cutting action.

When used as a hoe or as an edger, the handle is rotated so that the blade is placed in the position shown in Fig. 7, and the "hoe end" of the blade is caused to penetrate the soil to break up clods of dirt or the like, and being reinforced by the thicker central portion and the thick ribs extending from the central portion, the blade is sufficiently strong to accomplish the hoeing function efficiently.

The improved tool of my invention can thus be most efficiently used for both weeding, hoeing and edging and the same is susceptible of other analogous uses, by merely rotationally adjusting the handle in the hands to change the blade position.

The implement of my invention is also adapted for use as a relatively wider hoe than that shown in Fig. 7, by using the V-formed side edges as hoeing edges, where width rather than depth of hoeing is desirable.

Although I have shown and described a preferred form of my invention and preferred uses of the same, I contemplate that numerous and extensive departures may be made therefrom without, however, departing from the spirit of my invention and the scope of the appended claims.

I claim:

1. An improved implement comprising a handle and a blade, said blade being elongated and provided with six cutting edges including a straight cutting edge at both ends, and a pair of lateral straight cutting edges at each of the long sides, each said pair of lateral cutting edges meeting medially of the blade in an obtuse angle, the greatest width of said blade being not more than one-third of the length thereof, and said end edges being each not more than one-sixth of said blade length, and handle connecting means so joining the lower end of a handle to the generally middle portion of the blade as to cause said handle to extend in the vertical plane of the major axis of the blade and to extend at an acute angle greater than forty-five degrees to the underlying rear portion of the blade.

2. The implement substantially as set forth in claim 1, characterized by the lateral border portions being reinforced by a series of spaced transversely extending portions thereof being thicker than the intervening blade border portions.

WINTHROP WITHINGTON.